(12) United States Patent
Haham (10) Patent No.: US 10,973,315 B2
(45) Date of Patent: Apr. 13, 2021

(54) DEVICE STAND

(71) Applicant: Guy Shmuel Haham, Eilat (IL)

(72) Inventor: Guy Shmuel Haham, Eilat (IL)

( * ) Notice: Subject to any disclaimer, the term of this patent is extended or adjusted under 35 U.S.C. 154(b) by 0 days.

(21) Appl. No.: 16/623,779

(22) PCT Filed: Jun. 21, 2018

(86) PCT No.: PCT/IL2018/050689
§ 371 (c)(1),
(2) Date: Dec. 18, 2019

(87) PCT Pub. No.: WO2018/235086
PCT Pub. Date: Dec. 27, 2018

(65) Prior Publication Data
US 2020/0138186 A1    May 7, 2020

Related U.S. Application Data

(60) Provisional application No. 62/522,712, filed on Jun. 21, 2017.

(51) Int. Cl.
| | |
|---|---|
| *F16M 11/00* | (2006.01) |
| *A47B 23/04* | (2006.01) |
| *A47B 23/06* | (2006.01) |
| *F16M 11/04* | (2006.01) |
| *F16M 11/06* | (2006.01) |
| *F16M 11/20* | (2006.01) |
| *H04M 1/04* | (2006.01) |

(52) U.S. Cl.
CPC ............ *A47B 23/043* (2013.01); *A47B 23/06* (2013.01); *F16M 11/041* (2013.01); *F16M 11/06* (2013.01); *F16M 11/2021* (2013.01); *H04M 1/04* (2013.01)

(58) Field of Classification Search
CPC ...... A47B 23/06; F16M 11/041; F16M 11/06; F16M 11/2021; H04M 1/04
See application file for complete search history.

(56) References Cited

U.S. PATENT DOCUMENTS

| 7,766,288 | B2 * | 8/2010 | Kim | F16M 11/2064 |
| | | | | 248/176.1 |
| 8,611,076 | B2 * | 12/2013 | Wetzel | F16M 13/02 |
| | | | | 361/679.06 |
| 9,004,333 | B2 * | 4/2015 | Monaco | A45C 13/001 |
| | | | | 224/576 |
| 10,192,665 | B2 * | 1/2019 | Breiwa | H02J 50/10 |
| 2012/0252543 | A1 | 10/2012 | Cho | |
| 2015/0136820 | A1 * | 5/2015 | Kieley | F16M 11/10 |
| | | | | 224/201 |
| 2017/0264725 | A1 * | 9/2017 | Holder | H04M 1/04 |

FOREIGN PATENT DOCUMENTS

CN        202565341 U       11/2012

* cited by examiner

*Primary Examiner* — Amy J. Sterling (57) ABSTRACT

A device stand includes a support in which a platform is rotatably mounted, the rotatable mounting allowing the platform to spin by rotating rapidly or twirling about an axis. The platform is typically a circular or rounded disk and is constructed and arranged to support a device, such as a smartphone, allowing the device to spin with the spinning platform.

11 Claims, 7 Drawing Sheets

DEVICE STAND

CROSS-REFERENCES TO RELATED APPLICATIONS

The present invention is related to and claims priority from commonly owned U.S. Provisional Patent Application Ser. No. 62/522,712, entitled: Smartphone Stand, Bottle-opener, and Game, filed on Jun. 21, 2017, the disclosure of which is incorporated by reference in its entirety herein.

FIELD OF THE INVENTION

The present invention relates generally to accessories for smartphones, such as smartphone stands.

BACKGROUND OF THE INVENTION

Stands for smartphones are widely used, enabling the user a hands-free conversation and viewing of content on the smartphone screen. These stands typically hold the smartphone in a fixed position.

SUMMARY OF THE INVENTION

The present invention is directed to a device stand, which includes a support in which a platform is rotatably mounted, the rotatable mounting allowing the platform to spin by rotating rapidly or twirling about an axis. The platform is typically a circular or rounded disk and is constructed and arranged to support a device, such as a smartphone, allowing the device to spin with the spinning platform. As a result of this structure, when objects such as smartphones are mounted or otherwise attached to or supported by the platform, spinning games can be played.

Embodiments of the present invention are directed to a device stand. The device stand comprises: a base; oppositely disposed arms in communication with the base; a support rotatably mounted between the oppositely disposed arms; and, a platform rotatably mounted in the support so as to be spinnable when rotated in at least one rotation of 360 degrees.

Optionally, the platform is configured for holding a smartphone.

Optionally, the platform includes a disk.

Optionally, the at least one rotation includes one or more rotations.

Optionally, the platform is spinnable in the clockwise and counter-clockwise directions.

Optionally, the support includes: a recess for receiving the disk, and, a plurality of bearings between an internal surface of the recess and the disk.

Optionally, the device stand additionally comprises: a receiver for receiving the oppositely disposed arms in a slideable engagement, and, the receiver is pivotally mounted to the base.

Optionally, the receiver includes an open portion.

Optionally, the open portion is configured as a bottle opener.

Optionally, the device stand additionally comprises a stopper for positioning the platform at a fixed angular position relative to an axis of rotation of the platform.

Optionally, the device stand additionally comprises a first stepping mechanism, for adjusting the angular position of the support relative to a portion of the receiver.

Optionally, the device stand additionally comprises a second stepping mechanism, for adjusting the angular position of the receiver relative to the base.

Optionally, the platform comprises: a magnet in a space underneath an upper surface of the platform.

Optionally, the platform additionally comprises a ferromagnetic sticker, which is configured for attaching to a magnet associated with a smartphone.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Throughout this document, references to directions and orientations, such as upper, lower, top, bottom, lateral, the like. The references to these directions and orientations are exemplary, for describing and explaining the present invention, and embodiments thereof, and are not limiting in any way.

Figure 1:
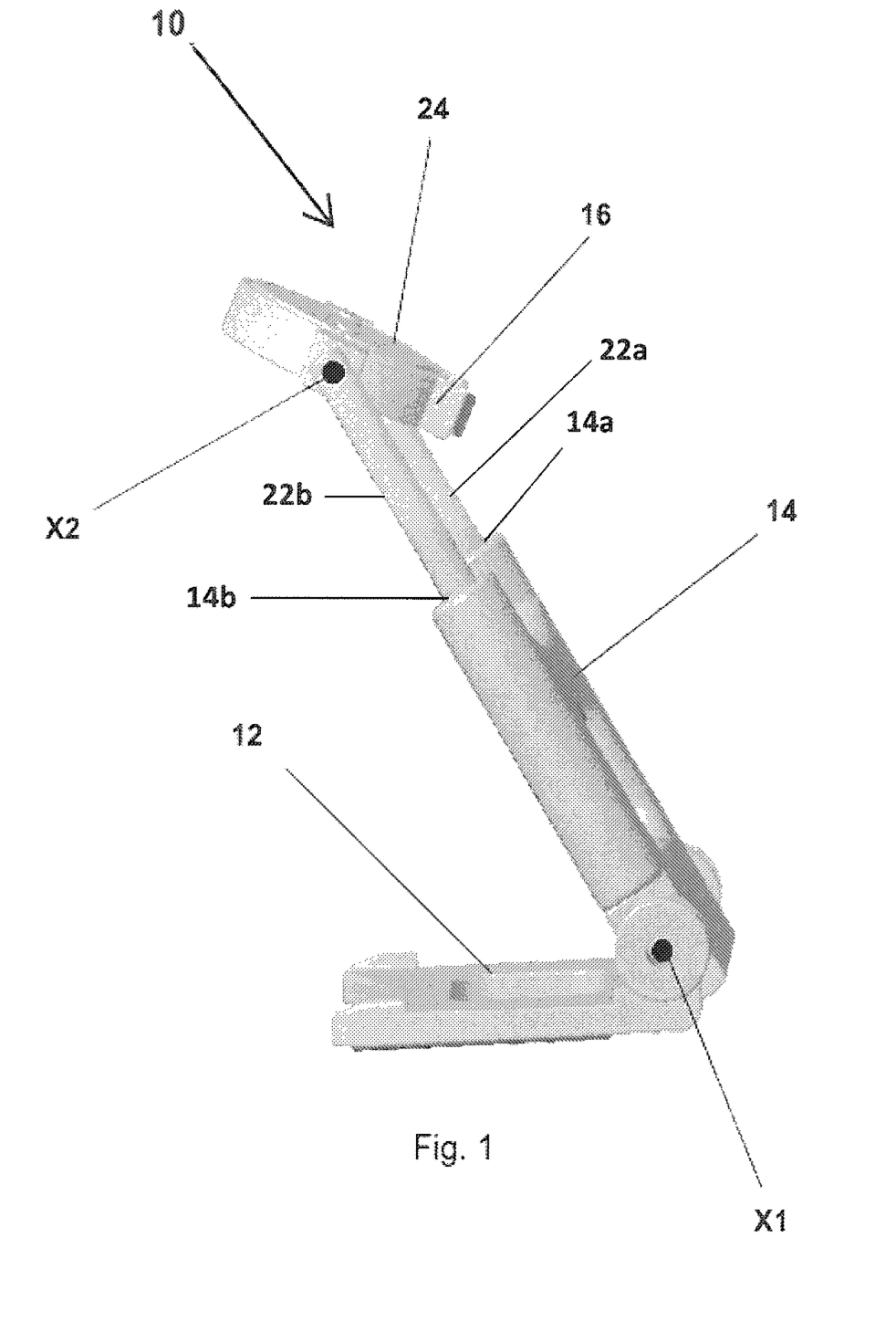
FIG. 1 is a side view of a device stand according to an embodiment of the invention.

FIG. 1 shows a device stand 10 according to an embodiment of the invention. The stand 10 includes a base 12 for supporting the stand 10 on a flat or other surface, and a receiver 14, pivotally mounted to the base 12. The receiver 14, receives oppositely disposed arms 22a, 22b in a slideable engagement, in respective channels 14a. 14b, such that the arms 22a. 22b are moveable into (retractable), and out of (extendable from), the respective receiver channels 14a, 14b. The arms 22a. 22b, for example, are hollow cylindrical rods or tubes.

A support 16 is rotationally mounted to each of the oppositely arms 22a. 22b. The support 16 includes a recess 28 for receiving a platform 24, in a rotatable mounting, which allows the platform 24 to spin, within the recess 28 of the support 16. The platform 24 is, for example, a rounded or circular disk, and the rotatable mounting is such that the disk is rotatable for one or more rotations of 360 degrees in either or both of the clockwise and counter-clockwise directions (as indicated by the double headed arrow 100). By allowing for one or more rotations of 360 degrees, the disk (of the platform 24) spins, and accordingly, is spinnable, within the support 16. For example, the platform 24. i.e., the disk, spins, when the disk rotates in a rapid and durable manner more than 360 degrees, and when in multiple rotations, performs at least one 360° rotation in less than one second. The disk is configured for holding a device, for example, a smartphone. By providing a platform 24 which can spin in multiple fast rotations, mounting of a smartphone or other object to the platform 24 allows for the playing of various spinning games.

The stand 10 is such that the angle at which the smartphone (not shown), which is attached to the upper surface of platform 24, is positioned, with respect to the base 12 can be adjusted in one of two ways. First, the receiver 14 is pivotally rotatable about a first axis X1 (to rotate in the directions of the double headed arrow 101), such that its angle relative to the base 12 can be adjusted (varied). Second, the support 16 is pivotally rotatable about a second transverse axis X2 (to rotate in the directions of the double headed arrow 102), such that its angle relative to receiver 14 can be adjusted (varied).

Figure 2:
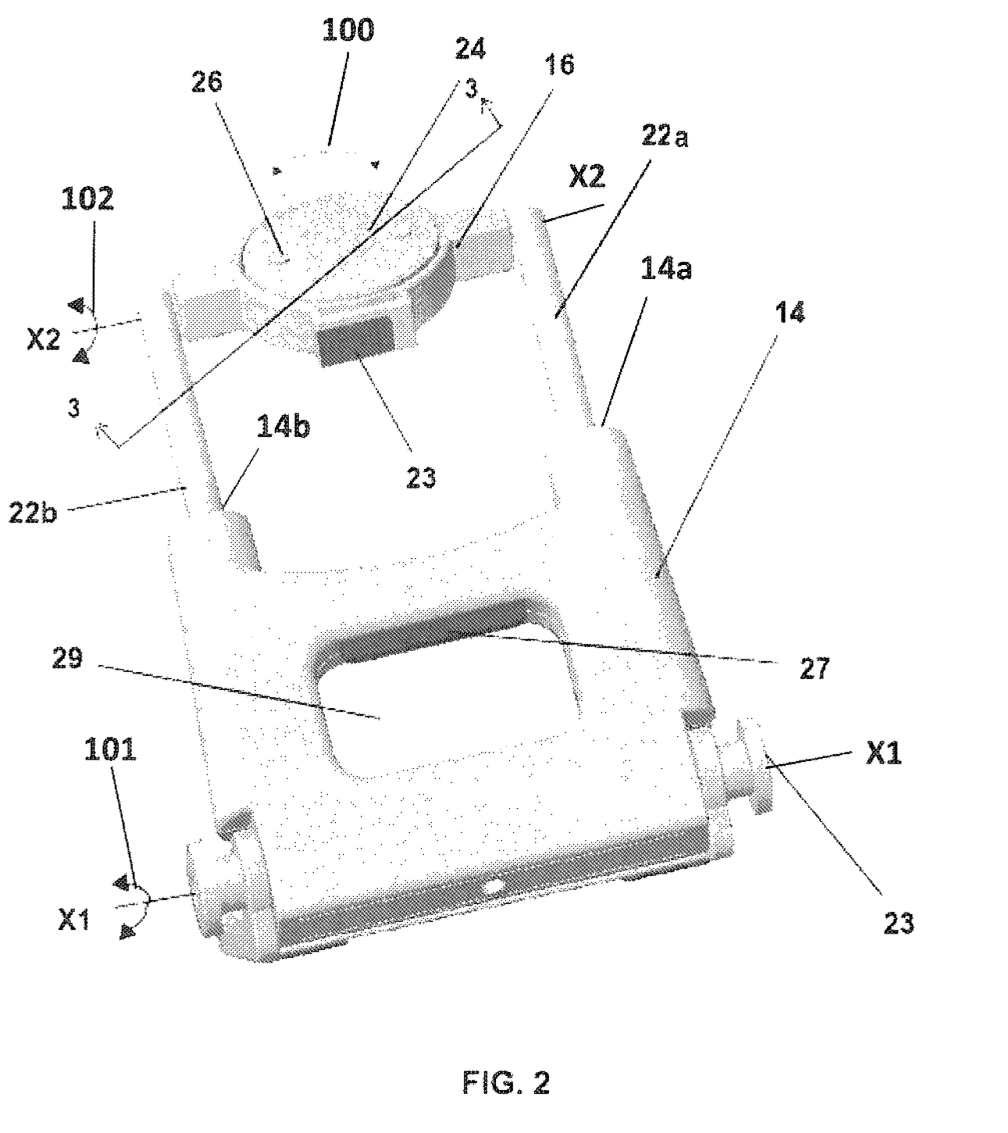
FIG. 2 is a front view of the device stand of FIG. 1.
Figure 3:
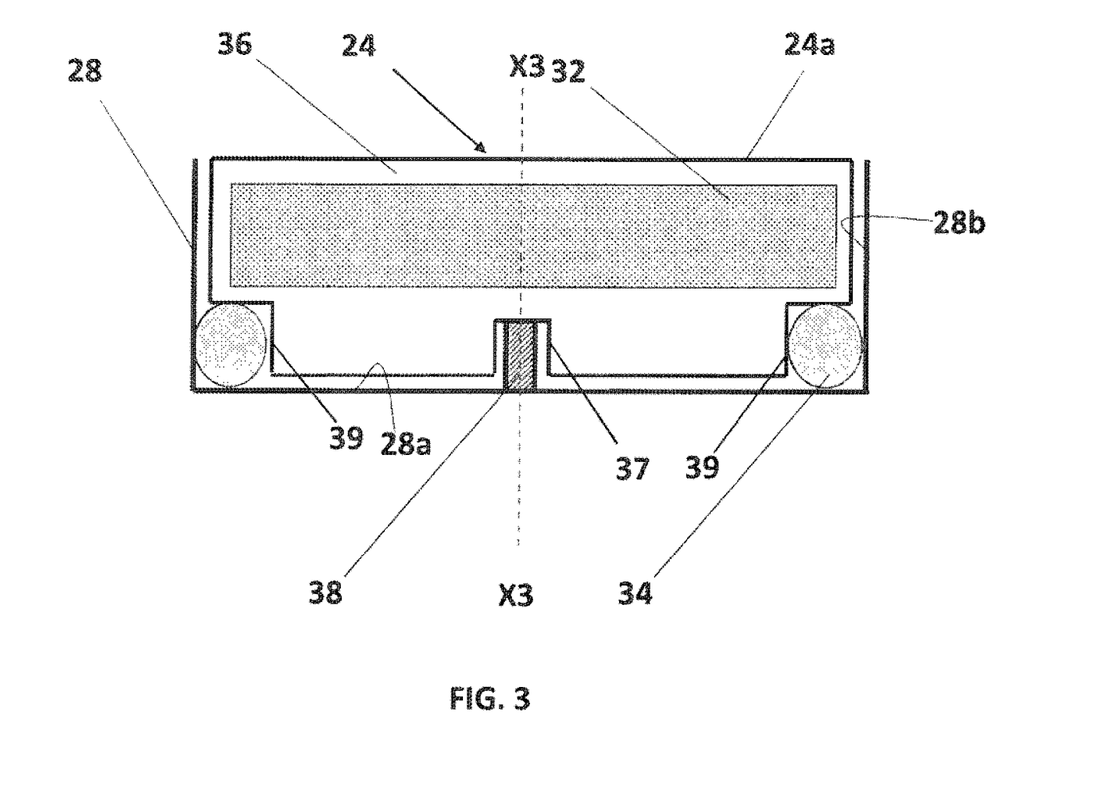
FIG. 3 is a cross sectional view of the support of the device stand taken along line 3-3 of FIG. 2.

FIG. 2 shows the stand 10 and the receiver 14 in a front view. The arms 22a, 22b extend from the respective channels 14a, 14b of the receiver 14. Turning also to FIG. 3, the platform 24 is such that it includes a magnet 32 within a space 36 underneath the upper surface 24a of the platform 24. A sticker (not shown) which is, for example, made of a ferromagnetic metal or magnet is, for example, attached to the back of the smartphone (or smartphone case or holder), enabling a magnetic attachment between a smartphone and the platform 24. Two or more protrusions 26 at the top surface of the platform 24, which cooperatively engage corresponding indents of the sticker, also facilitate holding, for example, a smartphone stable on the platform 24, when the platform 24 is spinning. Alternately, the sticker is attachable to the platform 24, whereby a magnet attached to, for example, a smartphone or a case therefor, as well as a metallic and magnetic portion of the smartphone or case therefor, will result in the aforementioned magnetic attachment between the platform 24 and a smartphone.

The receiver 14 may optionally include an opening 29 which is dimensioned so as to be a bottle opener. For example, the bottle opener opening 29 may be reinforced by a metal strip 27. Alternatively, a bottle opener may be provided within the base 12, rather than within the receiver 14.

Remaining in FIG. 3, there is shown the assembly for the platform 24 in the recess 28 of the support 16. The platform 24 seats in the recess 28, such that the platform 24 rotates about a protrusion 38 which extends upward from the floor 28a of the recess 28, along the axis X3 (the axis of rotation). The protrusion 38 is bounded by a cylinder 37, which extends into the platform 24.

Bearings 34 are positioned between slots 39 in the platform 24 and the internal surface of the recess 28, at the corners of the recess 28. The corners are formed by the (bottom) floor 28a of the recess 28 and the circular lateral wall 28b of the recess 28. This arrangement for the bearings 34 minimizes friction to facilitate spinning of the platform 24. While bearings 34 are one manner of promoting spinning of the platform 24, a substantially frictionless rotation may alternatively be obtained, for example, by use of lubricants on the contact surfaces between the cylinder 37 and the protrusion 38. Additionally, other attachment elements for temporarily attaching the smartphone, or any other device, object, or the like, to the platform 24, for stability during spinning, may be used.

Figure 4A:
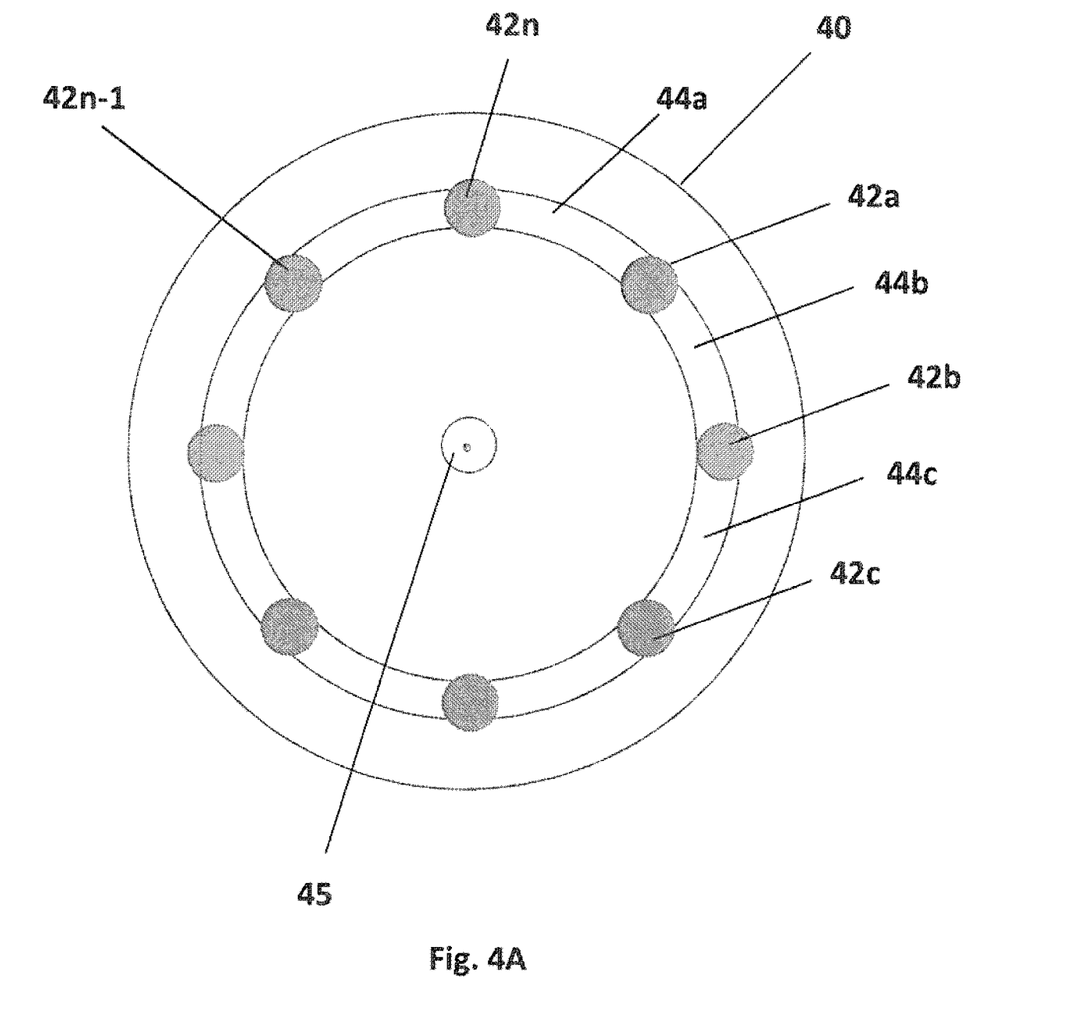
FIGS. 4A and 4B are diagrams showing a stepping mechanism for varying the relative angular position between the holder and the base of the stand; and, FIGS. 5A and 5B are diagrams showing a stepping mechanism for varying the angular position of the smartphone support relative to the holder.
Figure 4B:
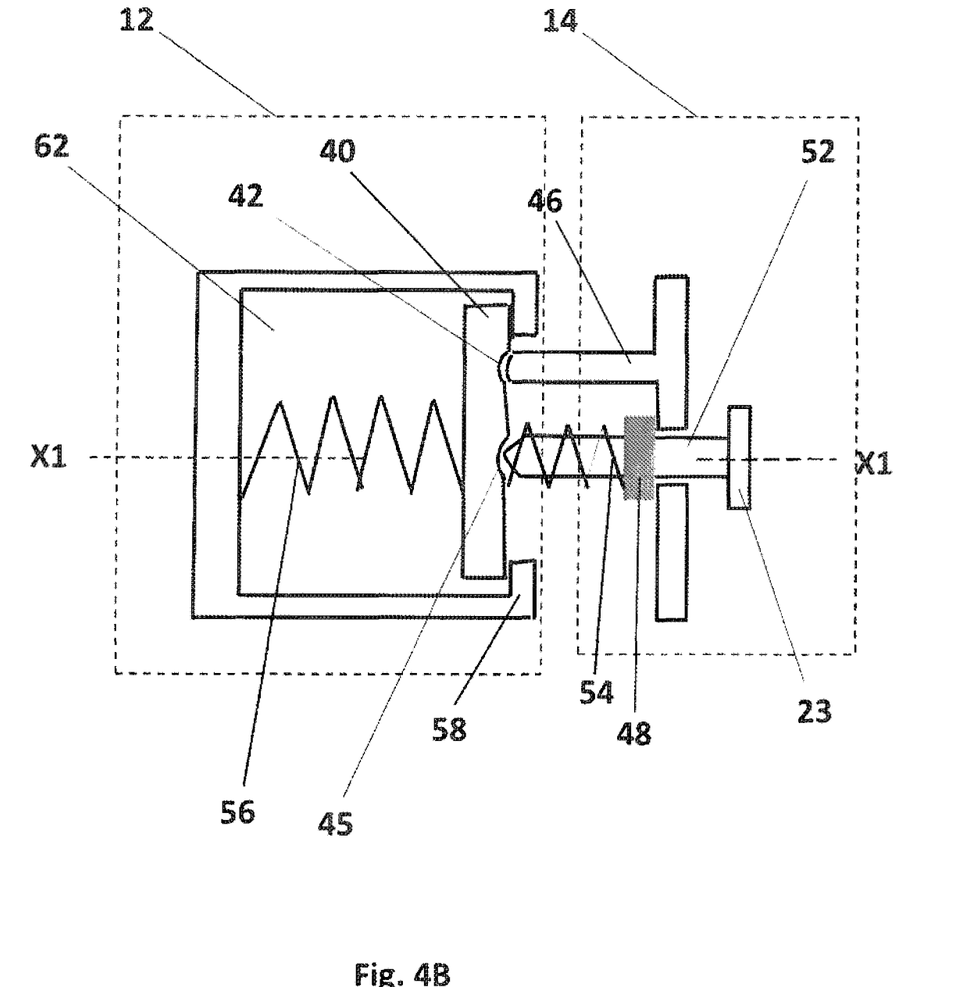

FIGS. 4A and 4B show in a schematic of a stepping mechanism for varying the relative angular position between the base 12 and the receiver 14. The illustration of FIGS. 4A and 4B is not to the scale, as it is for explanation purposes. The mechanism of FIGS. 4A and 4B may exist in one side or both sides of the stand 10 (although the figures show only one of the two such mechanisms).

As shown in FIG. 4A, a plurality of landing recesses 42a-42n are equi-angularly and equi-radially disposed on a stepping disk 40. A plurality of sloped recessed trails 44 connect between each two adjacent landing recesses 42a-42n. For example, a pin 46 may rest in the landing recess 42a, thereby setting a specific angular relation. When a variation of the orientation of the support 16 relative to the receiver 14 is desired, the pin 46 is guided along the sloped trail 44b in the clockwise direction, and lands at the landing recess 42b, thereby setting another angle of orientation. Next, in a similar manner, the pin 46 may be guided along the sloped trail 44c until landing at landing recess 42c, thereby setting still another angle of orientation.

It should be noted that in view of a height difference at the landing recesses 42, the trail 44 is a one-direction trail (in this case, a clockwise-direction trail). The stepping disk 40 further includes a central recess 45. As shown in FIG. 4B, stepping disk 40 is pushed by a first spring 56 against protrusions 58 at a cell 62, located at the base 12. The pin 46, which is a part of the receiver 14, rests within one of the recesses 42. In such a manner, rotation of the receiver 14 relative to the base 12 (about axis X1) moves the pin 46 along a respective trail 44 to an adjacent recess 42. When the pin 46 rests in a selected recess 42, the angular relation between the receiver 14 and the base 12 is fixed.

The rotation of the receiver 14 about the axis X1 is one-direction rotation, in view of the one-direction trail 44. When a rotation to the opposite direction (counter-clockwise relative to the disk 40 as shown in FIG. 4A) is desired, a release button 23 (or optionally two buttons 23) is pushed, pushing the stepping disk 40 by a pin 52, thereby to release the pin 46 from within the landing recess 42. This release enables a counter-clockwise rotation and counter-clockwise variation of the relative angular orientation between the base 12 and the receiver 14. A second spring 54 and protrusion 48 maintain the push button 23 and a pin 52 in place.

The resolution of the possible selected orientation angles is set by the density of the recesses 42. Furthermore, the recesses 42 may span arcs of less than 360° of the periphery of the disk 40, for example, 90°, 135°, and the like. If, for example, the recesses 42 span 90°, a selection of an angle between 0°-90° becomes possible (for example, 0°, 30°, 60°, or 90°).

Figure 5A:
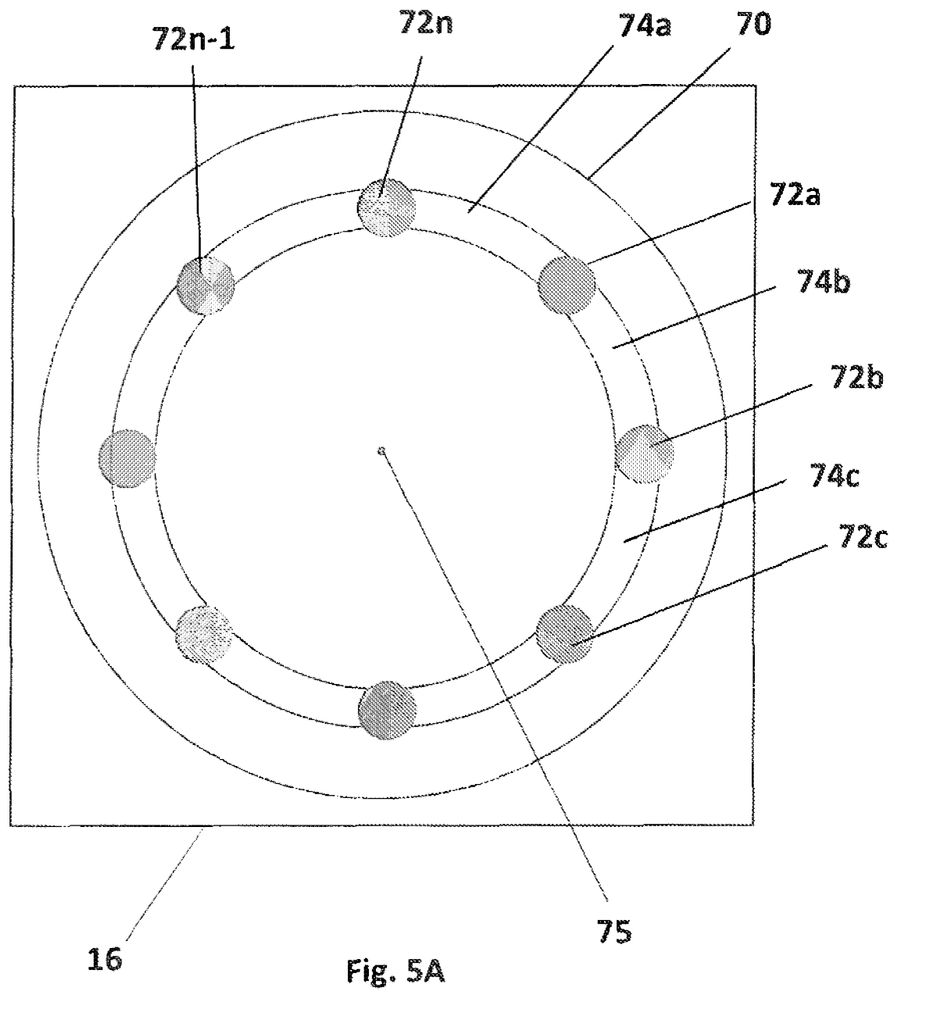
Figure 5B:
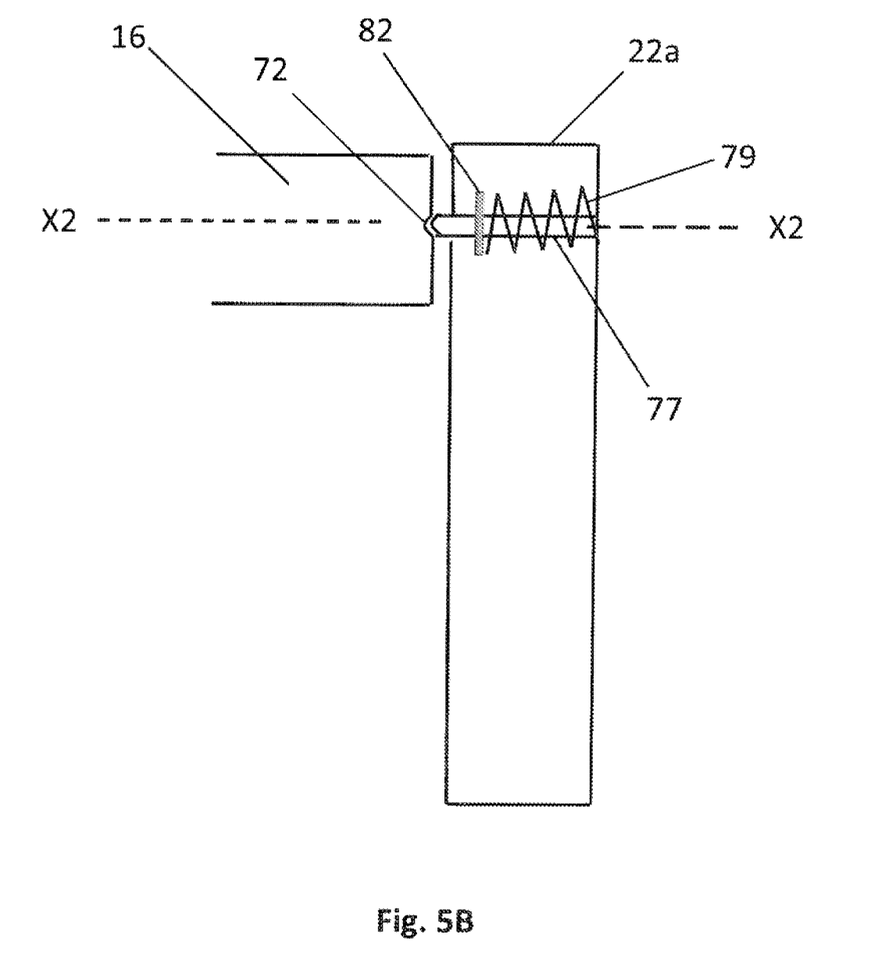

The stepping mechanism for varying the angular position of the support 16 relative to the receiver 14 is shown schematically in FIGS. 5A and 5B. The illustration of FIGS. 5A and 5B is not to the scale, as it is for explanation purposes. This mechanism is similar to the stepping mechanism of FIGS. 4A and 4B. Typically, two identical stepping mechanisms are provided at the two sides of the support 16, although, in some cases one of such a mechanism is sufficient.

A plurality of landing recesses 72a-72n are equi-angularly and equi-radially embedded at the side of the support 16, relative to an imaginary circle 70. Similar to that of the stepping mechanism of FIGS. 4A and 4B, a plurality of sloped recessed trails 74 connect between each of the two adjacent landing recesses 72a-72n. As shown in FIG. 5B, a pin 77 is mounted within the arm 22a, for example. The pin 77 has a collar 82, extending outward from the pin 77. The collar 82 is forced by a spring 79 in a direction outward of the arm 22a (via an opening in the arm 22a). The end of the pin 77 rests at one of the landing recesses 72 at the support 16 (FIG. 5A). A rotation of the support 16 about axis X2 varies the relative angular orientation between the support 16 and the receiver 14. The relative angular orientation may vary in steps between 0° and 360° (namely back to 0°), or this range may be limited to any angle in between.

The stand 10 of the invention further includes a stopper 23 (FIG. 2), which is used to prevent rotation of the spinning platform, at times when a stationary use of the stand 10 is desired. At a first position of the stopper 23, the stopper 23 does not affect the rotation (or spin) of platform 24. In a second state, the stopper 23 inserts a rod (not shown) via a suitable opening at the wall of the support 16, that applies friction on the platform 24, preventing the platform 24 from rotating, e.g., spinning. The stopper 23 may include an intermediate friction applying element (made, for example, of rubber or plastic) between the rod and the platform 24, to ensure a stationary state of the platform 24, when desired.

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. A device stand comprising:
    a base;
    oppositely disposed arms in communication with the base;
    a support rotatably mounted between the oppositely disposed arms; and,
    a platform including
        a disk rotatably mounted in the support so as to be spinnable when rotated in at one or more rotations of 360 degrees in clockwise and counter-clockwise directions with respect to said support,
        a recess for receiving the disk, and
        a plurality of bearings between an internal surface of the recess and the disk.

2. The device stand of claim 1, wherein the disk is configured for holding a smartphone.

3. The device stand of claim 1, additionally comprising:
    (a) a receiver for receiving the oppositely disposed arms in a slideable engagement, and,
    (b) the receiver is pivotally mounted to the base.

4. The device stand of claim 3, wherein the receiver includes an open portion.

5. The device stand of claim 4, wherein the open portion is configured as a bottle opener.

6. The device stand of claim 1, additionally comprising
    a stopper for positioning the platform at a fixed angular position relative to an axis of rotation of the platform.

7. The device stand of claim 1, additionally comprising
    a first stepping mechanism, for adjusting the angular position of the support relative to a portion of the receiver.

8. The device stand of claim 1, additionally comprising
    a second stepping mechanism, for adjusting the angular position of the receiver relative to the base.

9. The device stand of claim 1, wherein the platform comprises: a magnet in a space underneath an upper surface of the disk.

10. The device stand of claim 1, wherein the disk additionally comprises a ferromagnetic sticker, which is configured for attaching to a magnet associated with a smartphone.

11. The device stand of claim 1, wherein an axis of rotation of said support is perpendicular to a axis of spinning of said disk.

* * * * *